United States Patent
Yamaguchi et al.

(10) Patent No.: US 6,200,684 B1
(45) Date of Patent: Mar. 13, 2001

(54) PERFLUOROPOLYETHER-MODIFIED AMINOSILANE, SURFACE TREATING AGENT, AND AMINOSILANE-COATED ARTICLE

(75) Inventors: Hiromasa Yamaguchi; Kouichi Yamaguchi; Hirofumi Kishita, all of Usui-gun (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/573,561

(22) Filed: May 19, 2000

(30) Foreign Application Priority Data

May 20, 1999  (JP) .................................. 11-139596

(51) Int. Cl.$^7$ .................................. C08L 83/05
(52) U.S. Cl. ............... 428/447; 106/287.11; 106/287.14; 106/287.16; 428/429; 428/450; 428/451; 556/413; 556/418; 556/419

(58) Field of Search .......................... 106/287.11, 287.14, 106/287.16; 428/450, 429, 447, 451; 556/413, 418, 419

(56) References Cited

FOREIGN PATENT DOCUMENTS

| | | |
|---|---|---|
| 58-122979 | 7/1983 | (JP) . |
| 58-167597 | 10/1983 | (JP) . |
| 11-29585 | 2/1999 | (JP) . |

OTHER PUBLICATIONS

English Abstract of JP 58–167597.
English Abstract of JP 58–122979.
English Abstract of 11–29585.

*Primary Examiner*—D. S. Nakarani
(74) *Attorney, Agent, or Firm*—Millen, White, Zelano & Branigan, P.C.

(57) ABSTRACT

A novel perfluoropolyether-modified aminosilane cures into a film having improved water and oil repellency, parting and anti-staining properties. A surface treating agent comprising the aminosilane, and an article with a coating of the aminosilane are also provided.

6 Claims, 1 Drawing Sheet

PERFLUOROPOLYETHER-MODIFIED AMINOSILANE, SURFACE TREATING AGENT, AND AMINOSILANE-COATED ARTICLE

This invention relates to a novel perfluoropolyether-modified aminosilane which cures into a film having improved water and oil repellency, parting and anti-staining properties, a surface treating agent comprising the aminosilane, and an article with a cured coating of the aminosilane.

BACKGROUND OF THE INVENTION

In general, perfluoropolyether-containing compounds have water and oil repellency, chemical resistance, lubricity, parting properties and anti-staining properties because of their very low surface energy. For the effective utilization of such properties, these compounds are widely used in the industry as water/oil repellent anti-staining agents for paper and fibers, lubricants in magnetic recording media, oil repellants in precision machines, parting agents, cosmetics, and protective coatings.

However, the perfluoropolyether-containing compounds also have such properties as non-tackiness and non-adhesion to other substrates. They are applicable to the substrate surface, but cannot form a coating firmly bonded to the substrate.

Silane coupling agents are well known as the means for establishing a firm bond between a substrate surface such as glass or fabric and an organic compound. The silane coupling agent has an organic functional group and a reactive silyl group (typically alkoxysilyl group) in a molecule. The alkoxysilyl group undergoes self-condensation reaction with air-borne moisture, converting to a siloxane to form a coating. At the same time, the silane coupling agent forms chemical and physical bonds with the surface of glass or metal, resulting in a durable tough coating. By virtue of these advantages, the silane coupling agent is widely used as a coating agent to a variety of substrates.

As one typical example taking advantage of the above features, JP-A 58-167597 discloses a fluoroaminosilane compound of the following formula (3):

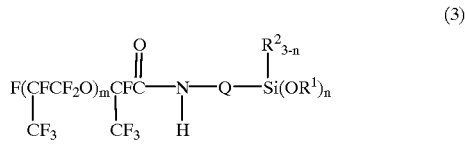

(3)

wherein $R^1$ and $R^2$ are $C_{1-4}$ alkyl, Q is $CH_2CH_2CH_2$ or $CH_2CH_2NHCH_2CH_2CH_2$, m is an integer of 1 to 4, and n is equal to 2 or 3. However, this compound fails to take full advantage of the perfluoropolyether group because the perfluoropolyether moiety is as short as 2 to 5 monomeric units of hexafluoropropylene oxide (HFPO).

Also JP-A 58-122979 discloses a compound of the following formula (4) as a water and oil repellant applicable to a glass surface.

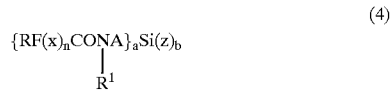

(4)

Herein, Rf is a polyfluoroalkyl group of 1 to 20 carbon atoms which may contain at least one ether bond, $R^1$ is hydrogen or lower alkyl, A is alkylene, X is $-CON(R^2)-Q-$ or $-SO_2N(R^2)-Q-$ (wherein $R^2$ is lower alkyl and Q is a divalent organic group), Z is lower alkyl, Y is halogen, alkoxy or $R^3COO-$ (wherein $R^3$ is hydrogen or lower alkyl), n is an integer of 0 or 1, a is an integer of 1 to 3, and b is an integer of 0, 1 or 2. However, this compound is not satisfactory because the number of carbon atoms in the fluorinated group is as small as 1 to 20.

The present inventors previously proposed a perfluoropolyether of the following formula (5) in JP-A 11-29585.

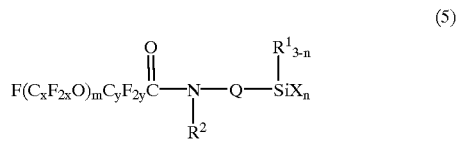

(5)

Herein, X is a hydrolyzable group, $R^1$ is lower alkyl, $R^2$ is hydrogen or lower alkyl, Q is $CH_2CH_2CH_2$ or $CH_2CH_2NHCH_2CH_2CH_2$, m is an integer of 6 to 50, n is equal to 2 or 3, and x and y each are an integer of 1 to 3. Because of good water and oil repellency, anti-staining properties, chemical resistance, lubricity, and parting properties, this perfluoropolyether-modified aminosilane can be utilized as a surface treating agent by coating onto surfaces of various substrates. However, the compound is not regarded satisfactory in performance to form a coat because the content (wt %) of hydrolyzable groups per molecule is low and consequently, curing takes a time. In particular, since many tall buildings are constructed in the recent decades, the demand for the technology for imparting "stain resistance" or "ease of stain removal" for keeping glazing maintenance-free is increasing. There is a desire to have a material meeting such a demand.

SUMMARY OF THE INVENTION

We have found that a novel perfluoropolyether-modified aminosilane of the following general formula (1) obtained by a method to be described later has improved water and oil repellency, anti-staining, chemical resistance, lubricity and parting properties. It can be used as a surface treating agent by coating to surfaces of various substrates. It cures into a coat which firmly bonds to a substrate so that the coat may sustain its effect over a long period of time.

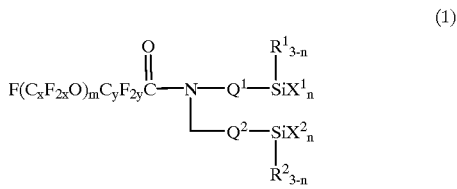

(1)

Herein $X^1$ and $X^2$ each are a hydrolyzable group, $R^1$ and $R^2$ each are a monovalent hydrocarbon group of 1 to 6 carbon atoms, $Q^1$ and $Q^2$ each are a divalent organic group, m is an integer of 6 to 50, n is equal to 2 or 3, x and y each are an integer of 1 to 3.

The perfluoropolyether-modified aminosilane of formula (1) serving as a main component of the surface treating agent contains an amide linkage. The amide linkage is known effective for the efficient orientation of modifying fluorine groups to the substrate surface. In this regard too, the surface treating agent of the invention is more effective than prior art agents.

Because of the inclusion of two hydrolyzable silyl groups, the perfluoropolyether-modified aminosilane of formula (1) is more reactive than the above-mentioned aminosilane of formula (4) and improved in cure and film formability.

Accordingly, the invention provides a novel perfluoropolyether-modified aminosilane of formula (1); a surface treating agent primarily comprising the perfluoropolyether-modified aminosilane and/or a partial hydrolytic condensate thereof; and an article having on its surface a cured coating primarily comprising the perfluoropolyether-modified aminosilane and/or a partial hydrolytic condensate thereof.

BRIEF DESCRIPTION OF THE DRAWING

The only FIGURE.

DESCRIPTION OF THE PREFERRED EMBODIMENT

Figure 1:
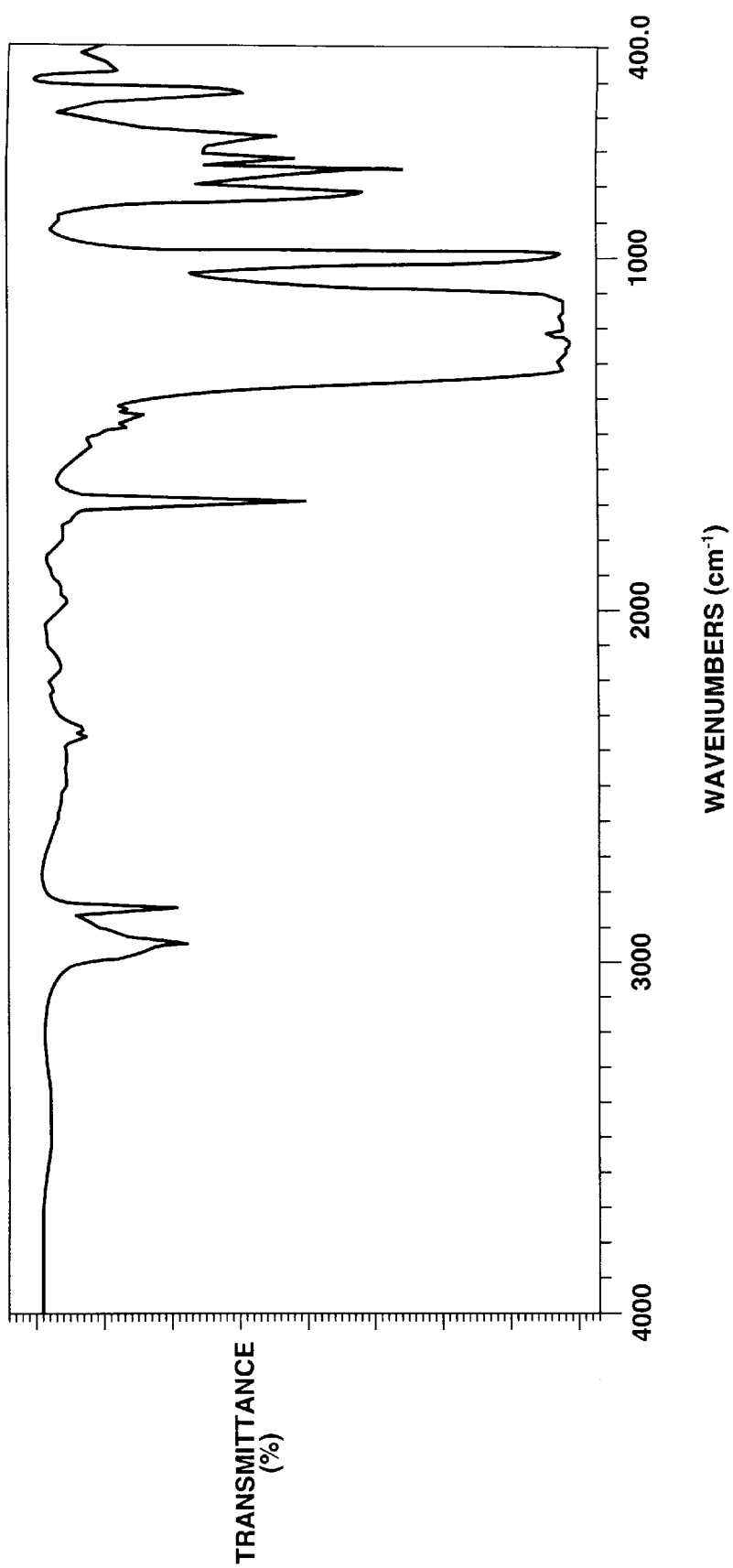
FIG. 1 is an IR spectrum diagram of the aminosilane obtained in Synthetic Example 1.

The perfluoropolyether-modified aminosilane of the invention is of the following general formula (1):

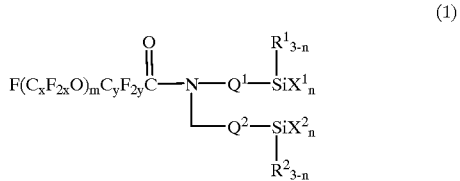

(1)

wherein $X^1$ and $X^2$ each are a hydrolyzable group, $R^1$ and $R^2$ each are a monovalent hydrocarbon group of 1 to 6 carbon atoms, $Q^1$ and $Q^2$ each are a divalent organic group, m is an integer of 6 to 50, n is equal to 2 or 3, x and y each are an integer of 1 to 3.

Specifically, $X^1$ and $X^2$ stand for hydrolyzable groups and may be the same or different. Illustrative examples include $C_{1-8}$ alkoxy groups such as methoxy, ethoxy, propoxy and butoxy, $C_{2-8}$ oxyalkoxy groups such as methoxymethoxy and methoxyethoxy, acyloxy groups such as acetoxy, $C_{2-8}$ alkenyloxy groups such as isopropenoxy, and halogen groups such as chloro, bromo and iodo. Of these, methoxy, ethoxy, isopropenoxy and chloro are preferred.

$R^1$ and $R^2$ stand for monovalent $C_{1-6}$ hydrocarbon groups and may be the same or different. Illustrative examples include methyl, ethyl and phenyl, with the methyl being preferred.

$Q^1$ and $Q^2$ stand for divalent organic groups and may be the same or different. The preferred divalent organic groups are alkylene groups of 3 to 10 carbon atoms, especially 3 to 6 carbon atoms, which may be separated by a NH group, oxygen atom or the like. More preferably, $Q^1$ and $Q^2$ stand for $CH_2CH_2CH_2$ or $CH_2CH_2NHCH_2CH_2CH_2$ or a mixture thereof.

The letter m is an integer of 6 to 50. A smaller number of m below the range fail to take advantage of the perfluoropolyether groups. Values of m beyond the range are undesirable for film formation because the proportion of alkoxysilyl groups in the entire molecule becomes extremely small so that the condensation reaction of alkoxysilyl groups is retarded. The value of m in the range of 15 to 35 is especially desirable for a good balance of function and reactivity.

The letter n is equal to 2 or 3 and may be the same or different. A mixture of a compound wherein n=2 and a compound wherein n=3 is acceptable. The letters x and y each are an integer of 1 to 3.

For the aminosilane, it is preferred that the perfluoropolyether moiety represented by $F(C_xF_{2x}O)_mC_yF_{2y}$ is of the following formula (2):

(2)

wherein m is as defined above. It is also preferred that the hydrolyzable groups represented by X are alkoxy groups.

The perfluoropolyether-modified aminosilane of the invention may be formed, for example, by effecting hydrosilylation reaction between a diallylamide derivative of a corresponding hexafluoropropylene oxide (HFPO) oligomer and a corresponding hydroxysilane.

In the second aspect of the invention, the surface treating agent contains the perfluoropolyether-modified aminosilane of formula (1) and/or a partial hydrolytic condensate thereof as a main component. If desired, a catalyst for alkoxysilane hydrolytic condensation may be added to the surface treating agent. Exemplary catalysts include organic tin compounds (e.g., dibutyltin dimethoxide and dibutyltin dilaurate), organic titanium compounds (e.g., tetra-n-butyl titanate), organic acids (e.g., acetic acid and methanesulfonic acid), and inorganic acids (e.g., hydrochloric acid and sulfuric acid). Of these, acetic acid, tetra-n-butyl titanate and dibutyltin dilaurate are desirable. The catalyst is added in a catalytic amount. Usually 0.01 to 5 parts, especially 0.1 to 1 part by weight of the catalyst is added per 100 parts by weight of the aminosilane of formula (1) and/or a partial hydrolytic condensate thereof.

The surface treating agent of the invention may be diluted with a suitable solvent prior to use. Useful solvents include fluorine-modified aliphatic hydrocarbon solvents (e.g., perfluoroheptane and perfluorooctane), fluorine-modified aromatic hydrocarbon solvents (e.g., m-xylene hexafluoride and benzotrifluoride), fluorine-modified ether solvents (e.g., methyl perfluorobutyl ether and perfluoro(2-butyltetrahydrofuran)), hydrocarbon solvents (e.g., petroleum benzine, mineral spirits, toluene and xylene), and ketone solvents (e.g., acetone, methyl ethyl ketone and methyl isobutyl ketone). Among others, fluorine-modified solvents are preferred for solubility and wettability, with m-xylene hexafluoride and perfluoro(2-butyltetrahydrofuran) being especially preferred. These solvents may be used alone or in admixture of two or more. It is desired to uniformly dissolve the above-mentioned components in the solvent.

Any well-known technique may be employed for treating surfaces of various substrates with the surface treating agent. For example, brush coating, dipping, spraying and evaporation techniques are useful. The treating conditions may be suitably chosen. As to the treating temperature, the optimum temperature varies with a particular treating technique. In the case of brush coating or dipping, the optimum temperature is in the range of room temperature to 120° C. As to the treating humidity, treatment under humid conditions is preferred because the reaction is promoted.

The substrate to which the surface treating agent of the invention is applicable includes a variety of materials such as paper, fabric, metals, glass, plastics, and ceramics.

The aminosilane of formula (1) forms a cured coating having improved water and oil repellency, parting properties and anti-staining properties. Exemplary applications of the surface treating agent that utilize these functions include water and oil repellants to be applied to paper, fabric, metals, glass, plastics, and ceramics; parting agents to be applied to adhesive tape, resin molding molds and rolls; and anti-staining agents to be applied to paper, fabric, metals, glass, plastics, and ceramics.

More illustrative applications are given below.

anti-staining coating on the surface of anti-reflection film etc., coating for preventing fingerprint and grease contamination on optical members such as eyeglass lenses and anti-reflection filters, water repellent, anti-staining coating on sanitary ware such as bathtubs, washbowls, toilets and lavatorys, anti-staining coating on glass for the general industry and window glass and head lamp covers in vehicles such as automobiles, trains and aircraft, water repellent, anti-staining coating on building exteriors, coating for preventing oil contamination on kitchen ware, water repellent, anti-staining, anti-sticking coating in telephone booths, water and oil repellent, anti-fingerprint coating on artistic objects.

The cured coating on the surface of a substrate or article as mentioned above usually has a thickness of 0.1 nm to 5 μm, and especially 0.1 nm to 1 μm though not critical. The exact thickness may be properly selected for a particular type of substrate.

In addition to the above-described applications, the aminosilane of formula (1) may also be used for improving the flow and dispersion of paint additives, resin modifiers and inorganic fillers, and the lubricity of tape and film.

The perfluoropolyether-modified aminosilane of the invention can form a cured coating having improved water and oil repellency, parting properties and anti-staining properties.

EXAMPLE

Examples of the invention are given below by way of illustration and not by way of limitation.

Synthetic Example 1

A 200-ml, three-necked flask equipped with a thermometer, reflux condenser and stirrer was charged with 87.1 g of a perfluoropolyether-modified diallylamide of the formula (6) shown below, 40.5 g of m-xylene hexafluoride, and 0.094 g of a toluene solution of a chloroplatinic acid/vinylsiloxane complex (containing $2.40 \times 10^{-6}$ mol of Pt), which were heated at 80° C. and stirred. Trimethoxysilane, 7.3 g, was added dropwise to the reaction mixture, which was ripened for 3 hours at 85° C. After the disappearance of allyl groups in the reactant was confirmed by $^1$H-NMR, the solvent and excess trimethoxysilane were distilled off in vacuum, leaving 84.0 g of a colorless clear liquid. The $^1$H-NMR and IR spectroscopy data of the compound are shown below.

(6)

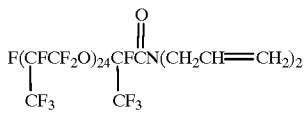

$^1$H-NMR (TMS standard, ppm)

| | |
|---|---|
| —CH$_2$CH$_2$Si≡ | 0.6–0.7 |
| —CH$_2$CH$_2$CH$_2$— | 1.7–1.9 |
| —CONCH$_2$CH$_2$— | 3.3–3.5 |
| —Si(OCH$_3$)$_3$ | 3.5–3.6 |

IR (KBr plate, liquid-membrane method, cm$^{-1}$, see FIG. 1)
2950-2820 (C—H)
1680 (CON)
1315-1090 (C—F)

From the above data, the compound was identified to have the following structural formula (7).

(7)

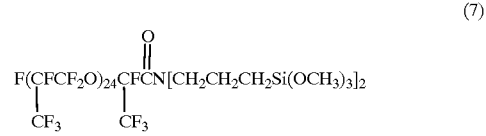

Synthetic Example 2

A compound of the following formula (8) was prepared by the same procedure as Synthetic Example 1 except that methyldimethoxysilane was used instead of the trimethoxysilane.

(8)

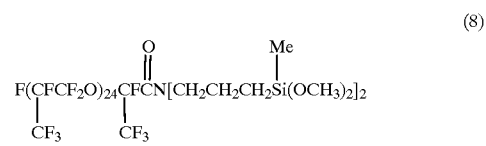

Synthetic Example 3

A compound of the following formula (10) was prepared by the same procedure as Synthetic Example 1 except that a compound of the following formula (9) was used instead of the perfluoropolyether-modified diallylamide of formula (6).

(9)

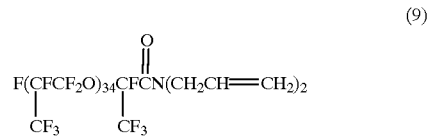

(10)

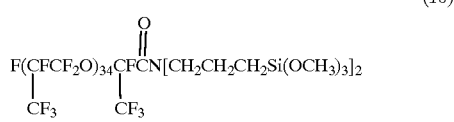

Synthetic Example 4 (Comparison)

A compound of the following formula (12) was prepared by the same procedure as Synthetic Example 1 except that a compound of the following formula (11) was used instead of the perfluoropolyether-modified diallylamide of formula (6).

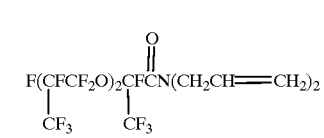

(11)

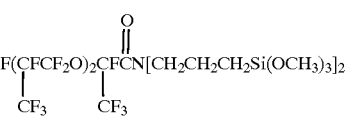

(12)

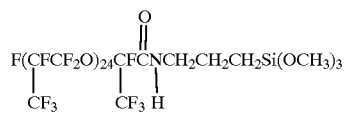

(13)

Examples 1-1 to 1-3

In 97.0 g of perfluoro(2-butyltetrahydrofuran) was dissolved 3.0 g of the perfluoropolyether-modified aminosilane synthesized in each of Synthetic Examples 1 to 3. The solution was brush coated onto a glass plate of 2.5×10×0.5 cm, and allowed to stand for one hour in an atmosphere at 25° C. and humidity 70% whereby the coating cured. This test specimen was examined by the following tests.

(1) Water and Oil Repellent Test

Using a contact angle meter model A3 (Kyowa Kaimen Kagaku K.K.), the contact angle of the cured coating with water and n-hexadecane was measured as the rating of water and oil repellency.

(2) Parting Test

A Cellophane adhesive tape strip (25 mm wide) was attached to the surface of the cured coating. Using a tensile tester, the tape strip was pulled and peeled at an angle of 180° and a rate of 300 mm/min. The force required for peeling was measured as the rating of parting property.

(3) Durability Test

The surface of the cured coating was wiped 30 strokes with cellulose non-woven fabric under a predetermined load. Thereafter, the contact angle with water was measured as in test (1), from which durability was evaluated.

(4) Hydrolysis (Film Formation) Test

In 97.0 g of perfluoro(2-butyltetrahydrofuran) was dissolved 3.0 g of the perfluoropolyether-modified aminosilane synthesized in each of Synthetic Examples 1 to 3. The solution was brush coated onto a glass plate of 2.5×10×0.5 cm. The coating was allowed to stand for 10 minutes in an atmosphere at 25° C. and humidity 70% whereupon the uncured residue on the surface was wiped off with cellulose non-woven fabric. The contact angle of the coated glass surface with water was measured as the rating of hydrolysis or film formability.

The results of these tests (1) to (4) are shown in Table 1.

Comparative Example 1-1

A cured coating was obtained and tested as in Examples 1-1 to 1-3 except that the fluoroaminosilane synthesized in Synthetic Example 4 was used instead of the fluoroaminosilanes in Examples 1-1 to 1-3. The test results are also shown in Table 1.

Comparative Example 1-2

A cured coating was obtained and tested as in Examples 1-1 to 1-3 except that a compound of the following formula (13) was used instead of the fluoroaminosilanes in Examples 1-1 to 1-3. The test results are also shown in Table 1.

TABLE 1

| | Water and oil repellency (deg) | | Parting | | |
|---|---|---|---|---|---|
| | Water | n-hexadecane | (g/25 mm) | Durability (deg) | Hydrolysis (deg) |
| E 1-1 | 114 | 72 | 19 | 113 | 110 |
| E 1-2 | 115 | 74 | 20 | 113 | 108 |
| E 1-3 | 118 | 75 | 16 | 114 | 113 |
| CE 1-1 | 101 | 63 | 87 | 97 | 96 |
| CE 1-2 | 110 | 72 | 20 | 101 | 87 |

The coatings of Examples show water and oil repellency and parting property at least comparable to the prior art coating (Comparative Example 1-2) and are improved in durability and hydrolysis (or film formation). The coating of Comparative Example 1-1 is inferior in water and oil repellency and parting property to the coatings of Examples and unacceptable on practical use.

It is thus evident that the perfluoropolyether-modified aminosilane of the invention forms a tough coating on a substrate surface and is applicable as a surface treating agent having improved water and oil repellency and parting property.

Examples 2-1 to 2-3

In 495.0 g of perfluoro(2-butyltetrahydrofuran) was dissolved 5.0 g of the perfluoropolyether-modified aminosilane synthesized in each of Synthetic Examples 1 to 3. Trifluoromethanesulfonic acid, 0.05 g, was added to the solution, followed by thorough agitation. An acrylic resin plate of 10×10×0.8 cm was dipped in the coating solution. The coating was allowed to stand for 2 hours in an atmosphere at 40° C. and humidity 85% whereby the coating cured. The surface was wiped off with dry fabric. This test specimen was examined by the following tests.

(1) Water Repellent Test

Using a contact angle meter model A3 (Kyowa Kaimen Kagaku K.K.), the contact angle of the cured coating with water was measured as the rating of water repellency.

(2) Anti-Staining Test

About 30 g of a contaminant shown in Table 2 was poured onto the coated acrylic resin plate. It was examined how the contaminant stuck to the coating. The contaminant-applied plate was air dried at room temperature for 15 minutes and then wiped with dry fabric. It was examined how the contaminant was wiped off. Evaluation was made according to the following criterion.

Contaminant sticking

◯: little sticking

Δ: some sticking

×: heavy sticking

Contaminant wiping-off

◯: light wiping

Δ: difficult to wipe off, but no track

×: difficult to wipe off, with track left

The results are shown in Table 2.

Comparative Example 2-1

A coating solution was prepared and examined as in Examples 2-1 to 2-3 except that the fluoroaminosilane synthesized in Synthetic Example 4 was used instead of the inventive aminosilane. The results are also shown in Table 2.

Comparative Example 2-2

A coating solution was prepared and examined as in Examples 2-1 to 2-3 except that $C_8F_{17}CH_2CH_2Si(OCH_3)_3$ was used instead of the inventive aminosilane. The results are also shown in Table 2.

Comparative Example 2-3

Without applying the coating solution, the acrylic resin plate was examined as in Examples 2-1 to 2-3. The results are also shown in Table 2.

TABLE 2

| | Water repellency (deg) | Anti-staining | | | |
|---|---|---|---|---|---|
| | | Chinese ink | | Squalane | |
| | | Sticking | Wiping | Sticking | Wiping |
| E 2-1 | 114 | O | O | O | O |
| E 2-2 | 114 | O | Δ | O | O |
| E 2-3 | 117 | O | O | O | O |
| CE 2-1 | 100 | Δ | X | Δ | X |
| CE 2-2 | 104 | Δ | Δ | Δ | Δ |
| CE 2-3 | 75 | Δ | X | X | X |

Examples 3-1 to 3-3

In 495.0 g of perfluorohexane was dissolved 5.0 g of the perfluoropolyether-modified aminosilane synthesized in each of Synthetic Examples 1 to 3. Trifluoromethanesulfonic acid, 0.05 g, was added to the solution, followed by thorough agitation. The coating solution was spin coated onto a glass lens. The coating was allowed to stand for 2 hours in an atmosphere at 40° C. and humidity 85% whereby the coating cured. The surface was wiped off with dry fabric. This test specimen was examined by the following tests.

(1) Water Repellent Test

Using a contact angle meter model A3 (Kyowa Kaimen Kagaku K.K.), the contact angle of the coated lens with water was measured as the rating of water repellency.

(2) Anti-Staining Test

The forefinger was pressed against the coated lens for 5 seconds, leaving a fingerprint. The lens was observed to examine whether the fingerprint was definite or obscure. It was also examined how the fingerprint was wiped off with dry fabric. The evaluation was made according to the following criterion. The rating was an average of a 5-member panel.

Fingerprint marking
○: little fingerprint left
x: definite fingerprint

Fingerprint wiping-off
○: light wiping
Δ: difficult to wipe off, but no track
x: difficult to wipe off, with track left The results are shown in Table 3.

Comparative Example 3-1

A coating solution was prepared and examined as in Examples 3-1 to 3-3 except that the fluoroaminosilane synthesized in Synthetic Example 4 was used instead of the inventive aminosilane. The results are also shown in Table 3.

Comparative Example 3-2

A coating solution was prepared and examined as in Examples 3-1 to 3-3 except that $C_8F_{17}CH_2CH_2Si(OCH_3)_3$ was used instead of the inventive aminosilane. The results are also shown in Table 3.

Comparative Example 3-3

Without applying the coating solution, the glass lens was examined as in Examples 3-1 to 3-3. The results are also shown in Table 3.

TABLE 3

| | Water repellency (deg) | Fingerprint sticking | Fingerprint wiping-off |
|---|---|---|---|
| E 3-1 | 114 | O | O |
| E 3-2 | 116 | O | O |
| E 3-3 | 117 | O | O |
| CE 3-1 | 97 | Δ | Δ |
| CE 3-2 | 110 | Δ | X |
| CE 3-3 | 38 | X | X |

It is evident that the coating agent composition of the invention is applicable to a wide variety of uses as a coating agent having improved water and oil repellency and anti-staining property.

Japanese Patent Application No. 11-139596 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

What is claimed is:

1. A perfluoropolyether-modified aminosilane of the following formula (1):

$$F(C_xF_{2x}O)_mC_yF_{2y}\overset{O}{\underset{\|}{C}}-N(-Q^1-SiX^1_n R^1_{3-n})(-Q^2-SiX^2_n R^2_{3-n}) \quad (1)$$

wherein $X^1$ and $X^2$ each are a hydrolyzable group, $R^1$ and $R^2$ each are a monovalent hydrocarbon group of 1 to 6 carbon atoms, $Q^1$ and $Q^2$ each are a divalent organic group, m is an integer of 6 to 50, n is equal to 2 or 3, x and y each are an integer of 1 to 3.

2. The perfluoropolyether-modified aminosilane of claim 1 wherein $F(C_xF_{2x}O)_mC_yF_{2y}$ is of the following formula (2):

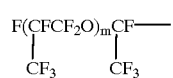

(2)

wherein m is as defined above.

3. The perfluoropolyether-modified aminosilane of claim 1 wherein the hydrolyzable group represented by $X^1$ and $X^2$ is an alkoxy group.

4. The perfluoropolyether-modified aminosilane of claim 1 wherein $Q^1$ and $Q^2$ each are $CH_2CH_2CH_2$ or $CH_2CH_2NHCH_2CH_2CH_2$.

5. A surface treating agent primarily comprising the perfluoropolyether-modified aminosilane of claim 1 or a partial hydrolytic condensate thereof or both.

6. An article having on its surface a cured coating primarily comprising the perfluoropolyether-modified aminosilane of claim 1 or a partial hydrolytic condensate thereof or both.

* * * * *